US010463548B1

(12) United States Patent
Haigh

(10) Patent No.: US 10,463,548 B1
(45) Date of Patent: Nov. 5, 2019

(54) HANDLE SYSTEM FOR MEDICAL DEVICES

(71) Applicant: CENTICARE Corporation, Minnetonka, MN (US)

(72) Inventor: James H. Haigh, Minnetonka, MN (US)

(73) Assignee: CENTICARE Corporation, Minnetonka, MN (US)

( * ) Notice: Subject to any disclaimer, the term of this patent is extended or adjusted under 35 U.S.C. 154(b) by 132 days.

(21) Appl. No.: 15/636,286

(22) Filed: Jun. 28, 2017

Related U.S. Application Data

(60) Provisional application No. 62/355,766, filed on Jun. 28, 2016.

(51) Int. Cl.
*A61G 5/10* (2006.01)
*B62B 5/06* (2006.01)
*B62B 3/02* (2006.01)
*B62B 3/10* (2006.01)

(52) U.S. Cl.
CPC .................. *A61G 5/10* (2013.01); *B62B 3/02* (2013.01); *B62B 5/06* (2013.01); *B62B 3/104* (2013.01); *B62B 2205/20* (2013.01)

(58) Field of Classification Search
CPC .. B62B 3/02; B62B 3/104; B62B 5/06; B62B 2205/20; A61G 5/10
USPC .............................................. 280/304.1
See application file for complete search history.

(56) References Cited

U.S. PATENT DOCUMENTS

| 4,542,918 | A | | 9/1985 | Singleton | |
|---|---|---|---|---|---|
| 4,863,181 | A | | 9/1989 | Howle | |
| 4,964,648 | A | * | 10/1990 | Berkowitz | B62B 5/06 16/426 |
| 5,044,650 | A | | 9/1991 | Eberle, Jr. | |
| 5,244,225 | A | * | 9/1993 | Frycek | A61G 5/1054 280/304.1 |
| 5,290,055 | A | | 3/1994 | Treat, Jr. | |

(Continued)

OTHER PUBLICATIONS

L.H.V. Van Der Woude, C.M. Van Koningsbruggen, A.L. Kroes and I. Kingma, Effect of Push Handle Height on Net Moments and Forces on the Musculoskeletal System During Standardized Wheelchair Pushing Tasks, Prosthetics and Orthotics International, 1995, vol. 19, pp. 188-201.

*Primary Examiner* — Kevin Hurley
*Assistant Examiner* — Felicia L. Brittman
(74) *Attorney, Agent, or Firm* — DuFault Law Firm, P.C.; Dustin R. DuFault

(57) ABSTRACT

The present invention includes a system of cooperating handles for simultaneously maneuvering a wheelchair and a medical cart. The system comprises a first handle attachable to a wheelchair and a second handle attachable to the medical cart. The first handle has a lower portion and an upper portion, the lower portion adapted to receive a handlebar of the wheelchair. The upper portion of the first handle is vertically oriented. The second handle has a lower portion and an upper portion, with the lower portion being attachable to the medical cart. The upper portion of the second handle is also vertically oriented. The wheelchair and the medical cart are positionable to place the upper portions of the first and second handles proximate to one another so that a user can grasp each upper portion by a single hand to simultaneously maneuver the wheelchair and the medical cart together.

2 Claims, 5 Drawing Sheets

(56) References Cited

U.S. PATENT DOCUMENTS

| | | | |
|---|---|---|---|
| 5,482,239 A * | 1/1996 | Smith | A61G 5/10 |
| | | | 248/229.13 |
| 5,568,933 A | 10/1996 | Mizuno | |
| 5,769,440 A * | 6/1998 | Jones | A61G 5/10 |
| | | | 280/204 |
| D407,672 S * | 4/1999 | Wells | D12/133 |
| 5,915,712 A | 6/1999 | Stephenson et al. | |
| 6,182,529 B1 | 2/2001 | White | |
| 7,188,855 B1 * | 3/2007 | Thomas | A61G 5/10 |
| | | | 280/288.4 |
| 7,500,689 B2 * | 3/2009 | Pasternak | A61G 5/10 |
| | | | 280/250.1 |
| 7,694,606 B1 | 4/2010 | Williams | |
| 7,886,854 B2 | 2/2011 | Chiu | |
| 8,215,652 B2 | 7/2012 | Dashew et al. | |
| 8,641,078 B2 | 2/2014 | Yang | |
| 8,714,171 B1 * | 5/2014 | Haygood | A61G 7/1038 |
| | | | 135/66 |
| 8,870,209 B2 * | 10/2014 | Conrad | B60D 1/167 |
| | | | 280/250.1 |
| D766,140 S * | 9/2016 | Chun | D12/133 |
| 2005/0211011 A1 | 9/2005 | Victor et al. | |
| 2013/0104691 A1 | 5/2013 | Chesner et al. | |
| 2014/0300079 A1 * | 10/2014 | Rhodes | A61G 5/061 |
| | | | 280/304.1 |

\* cited by examiner

HANDLE SYSTEM FOR MEDICAL DEVICES

CROSS-REFERENCE TO RELATED APPLICATION(S)

The present application claims a benefit of U.S. Provisional Application No. 62/355,766 filed Jun. 28, 2016, the contents of which are incorporated herein in their entirety by this reference.

BACKGROUND OF THE INVENTION

The present invention is generally directed at wheelchairs and carts as used in the medical industry. More specifically, the present invention includes a set of cooperating handles, one attachable to wheelchair and the other to a medical cart, such that the wheelchair and medical cart can be maneuvered simultaneously.

Wheelchairs are well known in the art as a means of assisting or transporting those who can not, or have a difficult time, walking on their own. Oftentimes, when transporting a patient in a wheelchair, the patient may require use of a cart to transport articles needed, or being used, by the patient. For example, the patient may need a car to transport personal articles, an oxygen tank or medical supplies. In instances when the use of oxygen is necessary, the cart carrying the oxygen tank must always be in close proximity to the patient in the wheelchair, as dictated by the length of the hoses connecting the oxygen tank to the oxygen apparatus being used by the patient. In those situations, it is extremely difficult for a single user, or assistant, to both maneuver the patient in the wheelchair while simultaneously moving the oxygen cart or the like. In that regard, either two assistants are needed to both assist the person in the wheelchair and to maneuver the medical cart, or the single assistant must do both, which can lead to less attention being paid to the patient.

There therefore exists a need in the art to provide a means by which wheelchairs and carts can be simultaneously maneuvered by a single user or assistant with greater ease.

BRIEF SUMMARY OF INVENTION

The present invention includes a system of cooperating handles for simultaneously maneuvering a wheelchair and a medical cart. The system comprises a set of first and second cooperating handles. The first handle, attachable to the wheelchair, includes a lower portion and an upper portion. The lower portion is adapted to receive a handlebar of the wheelchair. The upper portion is vertically oriented. The second handle, attachable to the medical cart, also includes a lower portion and an upper portion. The lower portion of the second handle is attachable to the medical cart, whereas the upper portion is vertically oriented. Upon attaching the first handle to the wheelchair, and the second handle to the medical cart, the wheelchair and the medical cart are positionable proximate to one another so as to place the upper portion of the first handle in close proximity to the upper portion of the second handle. Whereupon, the upper portion of the first handle and the upper portion of the second handle are capable of being grasped by a single hand of a user to simultaneously maneuver the wheelchair and the medical cart together.

BRIEF DESCRIPTION OF THE DRAWINGS

The following figures are used herein in conjunction with the written description to assist in understanding the invention. The Figures are as follows.

DESCRIPTION OF THE INVENTION

Figure 1:
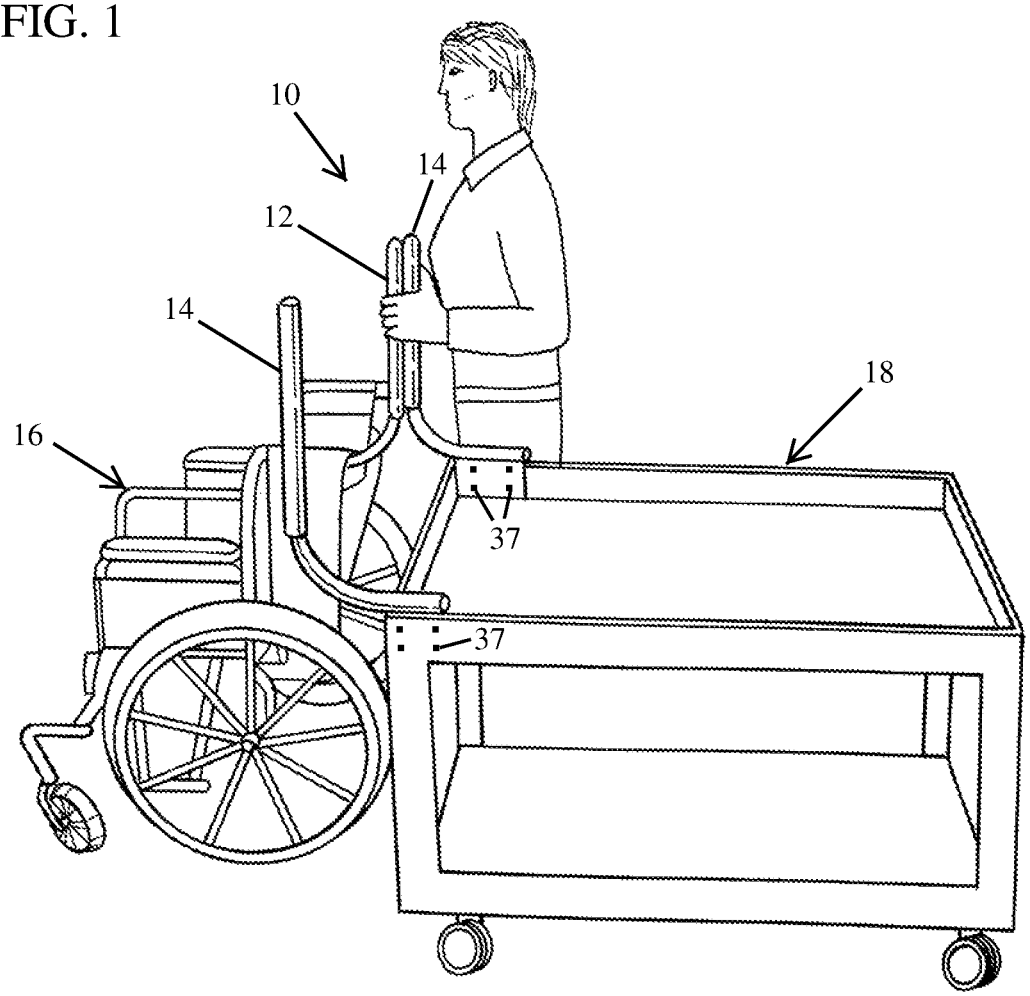
FIG. 1 is a perspective view of an assistant simultaneously grabbing a system of handles in accordance with the present invention.

A handling system in accordance with the present invention is generally indicated at 10 in FIG. 1. The handling system 10 generally includes first and second cooperating handles 12, 14, respectively, for simultaneously maneuvering a wheelchair 16 and a medical cart 18. For purposes of this description, a wheelchair includes any wheeled device or apparatus which assists mobility of a person, either sitting or kneeling, or on one or both knees, including wheeled bedpan chairs. Also for purposes of this description, a medical cart includes any device or apparatus having one or more wheels and which is used to transport, in general relation to a hospital or clinical setting, personal or medical items, including carts for transporting oxygen tanks, carts for transporting medical supplies, medical workstations including mobile point-of-care workstations, and carts for holding intravenous bags of saline or medicaments.

Figure 2:
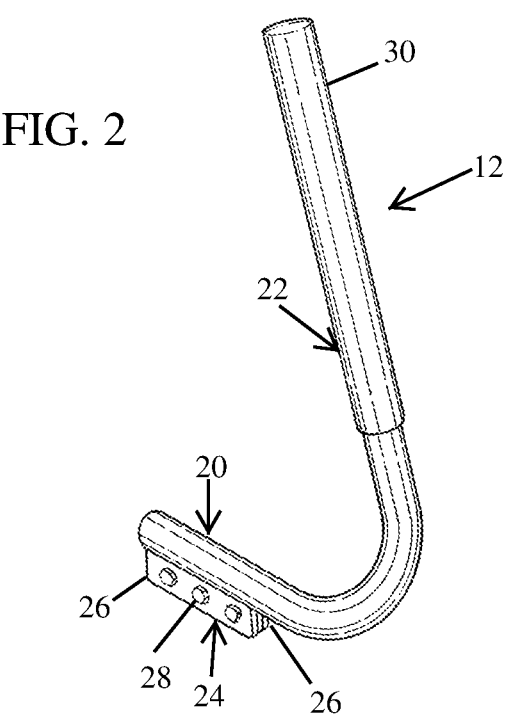
FIG. 2 is a perspective view of a first handle in accordance with the system of the present invention.

The first handle 12 is preferably similar to the handle as disclosed in commonly owned U.S. Pat. No. 9,931,255, the contents of which are incorporated entirely herein by reference. As illustrated in FIG. 2, the first handle 12 is configured from a hollow tube or pipe, preferably metallic, but can be made from any suitable material, including flat materials. The handle 12 has a generally "L"-shaped configuration, including a first lower connecting portion 20 and a second upper grasping portion 22. The first lower connecting portion 20 and the second upper grasping portion 22 are preferably off-set from one another by an angle of approximately 90 degrees. However, it is well within the scope of the present invention that this off-set angle be between 70 and 110 degrees to accommodate existing wheelchairs 16 from a variety of manufacturers which may have an upward or downward canted handlebar. The first lower connecting portion 20 is sized such that the existing handle of the wheelchair 16 is disposable therein in order to attach the first handle device 12 to the existing handlebar of the wheelchair 16.

To facilitate the connection of the first handle 12 to the wheelchair 16, a locking mechanism 24 is provided. The locking mechanism 24 is preferably an integral part of the first connecting portion 20 and provides for a compression fit about the handlebar of the wheelchair 16 when disposed within the first connecting portion 20. Spaced-apart plates 26 affix to the lower portion 20 along a slot (not shown), wherein each attaching plate 26 is urged toward one another by a set of fasteners 28 disposed within apertures contained within the plates 26. Once the fasteners 28 are tightened, the handle 12 is firmly attached to the handlebar of the wheelchair 16. A rubber or plastic grip 30 disposes onto the upper portion 22 to facilitate gripping by the user or assistant.

Figure 4:
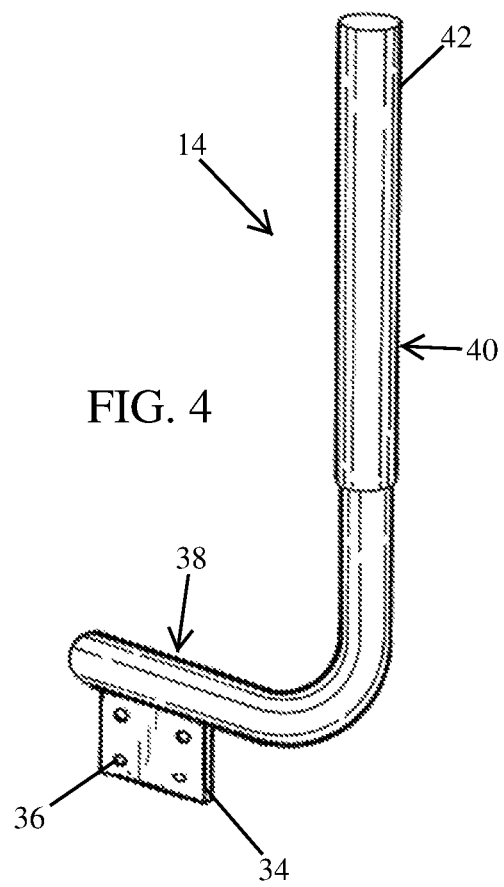
FIG. 4 is a perspective view of an alternative embodiment second handle in accordance with the present invention.
Figure 3:
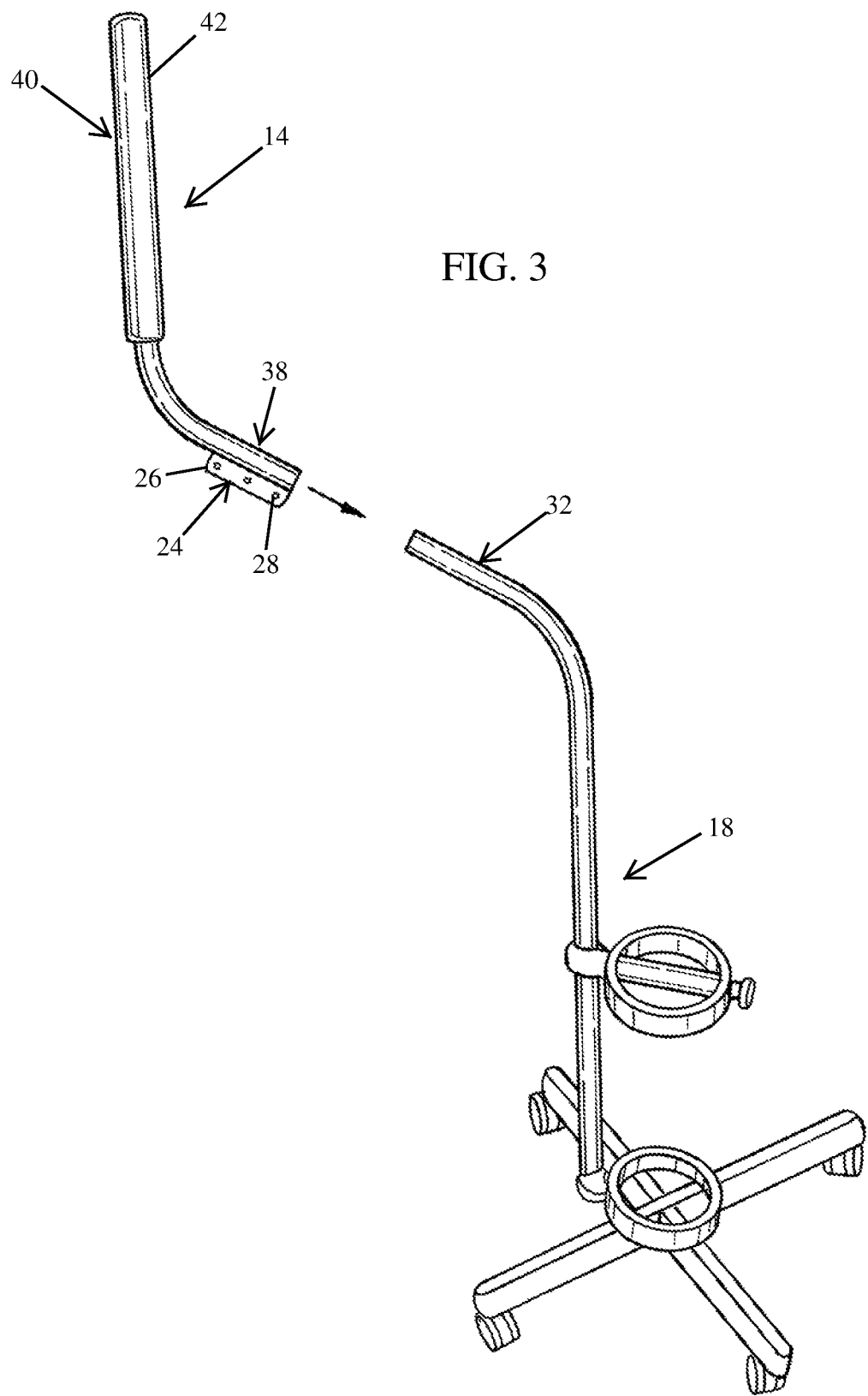
FIG. 3 is a perspective view of a second handle in accordance with the present invention.

The second handle 14 may be constructed in similar fashion as the first handle 12, as previously described, wherein similar references denote similar parts. For example, as illustrated in FIG. 3, the second handle 14 is affixable to an upper tubular portion 32 of the medical cart 18, which in this instance is a cart used for transporting oxygen tanks. The locking mechanism 24 secures the second handle 14 to the tubular portion 32 in a similar manner as described with respect to the attachment of the first handle 10 to the handlebar of the wheelchair 16. Alternatively, the second handle 14 may be configured to attach other surfaces of medical carts 18, including flat surfaces as illustrated in connection with FIG. 1. For that type of attachment, as illustrated in FIG. 4, the second handle 14 includes a rectangular plate 34 with apertures 36 for receiving fasteners 37, whereby the plate 34, and thus the second handle 14, is secured to the medical cart 18. In either instance, the second handle 14 has a generally "L"-shaped configuration, including a first lower connecting portion 38 and a second upper grasping portion 40. The first lower connecting portion 38 and the second upper grasping portion 40 may be off-set from one another by an angle of approximately 90 degrees, as illustrated in FIG. 4, but can be off-set at angle from between 70 and 110 degrees, as illustrated in FIG. 3. In any case, the off-set angle is such that when the lower portion 38 of the second handle 14 is attached to the medical cart 18, the upper portion 40 maintains a generally vertical orientation. Similar to the first handle 12, the second handle 14 also includes a rubber or plastic grip 42 disposed onto the second upper portion 40 to facilitate gripping by the user or assistant. It also within the scope of the present invention, to affix more then one handle 14 to the medical cart 18, as illustrated in FIG. 1, to assist in maneuvering the medical cart 18, for example to push or pull the medical cart 18 on its own, or so that either side of the medical cart 18 can be selected when being used in conjunction with the wheelchair 16.

Figure 5:
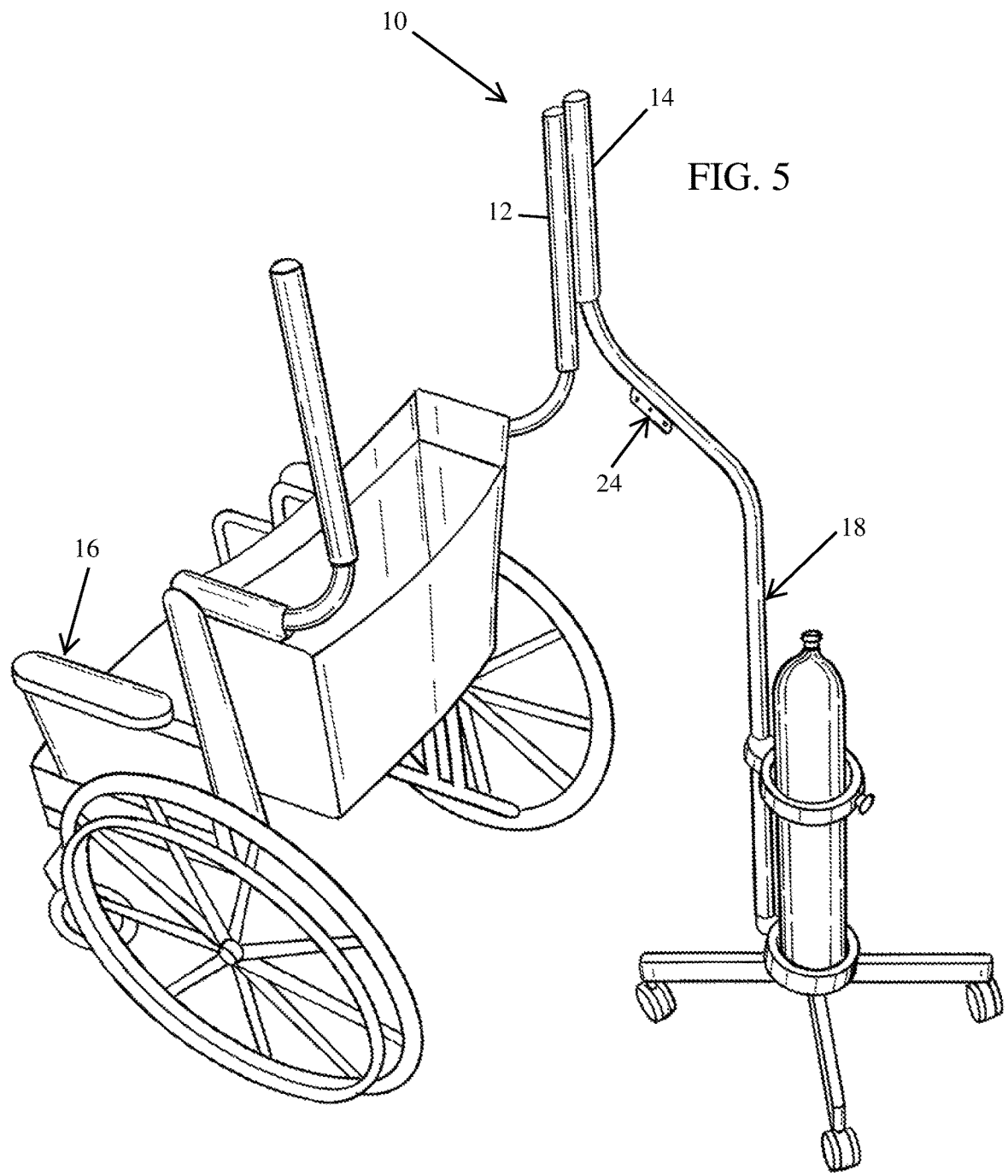
FIG. 5 is a perspective view of the system of handles of the present invention with the first handle of the wheelchair positioned in close proximity to the second handle of the medical cart.
Figure 6:
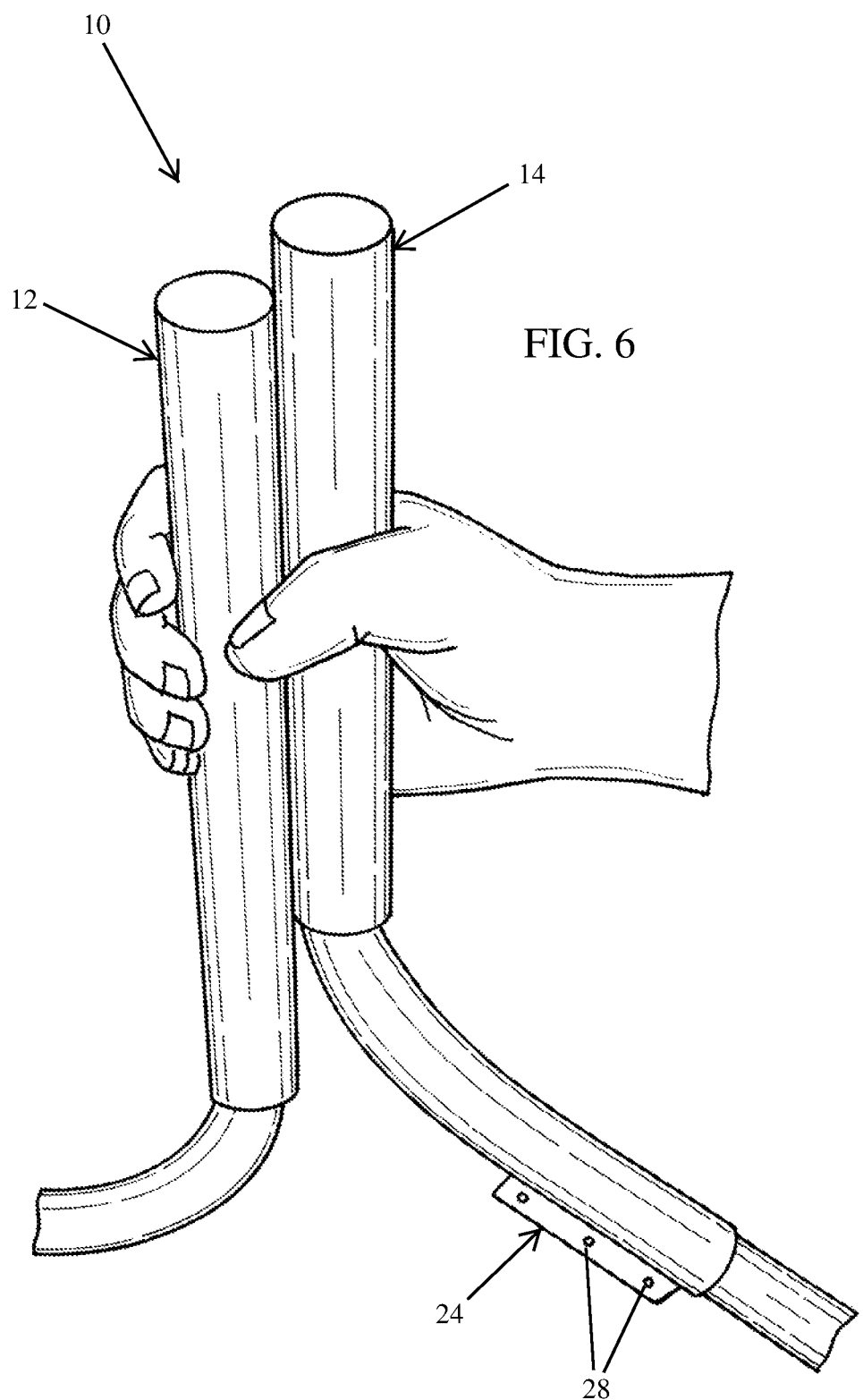
FIG. 6 is a perspective view of an assistant simultaneously grabbing with a single hand the system of handles of the present invention.

In operation, with the first handle 12 affixed to the wheelchair 16 and the second handle 14 affixed to the medical car 18, the manner previously described, the user positions the medical cart 18 so that the upper portion 40 of the second handle 14 is in close proximity to, or engages with, the similarly situated upper portion 22 of the first handle 12 connected to the wheelchair 16, as illustrated in FIG. 5. Once the first handle 12 and the second handle 14 are positioned proximate to one another, the user can grasp with a single hand both the vertically oriented first handle 12 of the wheelchair 16 and the vertically oriented second handle 14 of the medical cart 18, as illustrated in FIG. 6. With the medical cart 18 being offset from the wheelchair so that the user is standing directly behind the wheelchair, the user can then maneuver both the wheelchair 16 and the medical cart 18 simultaneously with one another, as illustrated in FIG. 1. In other words, the medical cart is offset from the wheelchair, permitting the user to walk behind the wheelchair and abreast of the medical cart.

It is recognized there are multiple variations beyond what are outlined in the detailed description to accomplish the objectives set forth by the current invention. Further alternative embodiments provide additional utility of the device for the convenience of the user. As such, although the present invention has been described with reference to preferred and alternative embodiments, workers skilled in the art will recognize that changes may be made in form and detail without departing from the spirit and scope of the invention.

The invention claimed is:

1. A method of simultaneously maneuvering a wheelchair and a medical cart, the method comprising:
    providing a first handle attachable to a wheelchair, the first handle having a lower portion and an upper portion, the lower portion adapted to receive a handlebar of the wheelchair, the upper portion vertically oriented;
    attaching the first handle to the wheelchair;
    providing a second handle attachable to a medical cart, the second handle having a lower portion and an upper portion, the lower portion attachable to the medical cart, the upper portion vertically oriented;
    attaching the second handle to the medical cart; and
    positioning the wheelchair and the medical cart in close proximity to one another such that the upper portion of the first handle engages the upper portion of the second handle, whereby the upper portion of the first handle and the upper portion of the second handle are capable of being grasped by a user to simultaneously maneuver the wheelchair and the medical cart together.

2. The method of claim 1, wherein positioning the wheelchair and the medical cart in close proximity to one another, the medical cart is offset from the wheelchair, permitting the user to walk behind the wheelchair and abreast of the medical cart.

* * * * *